R. L. LEE.
CATTLE STAKING DEVICE.
APPLICATION FILED MAY 11, 1911.
1,047,665.
Patented Dec. 17, 1912.
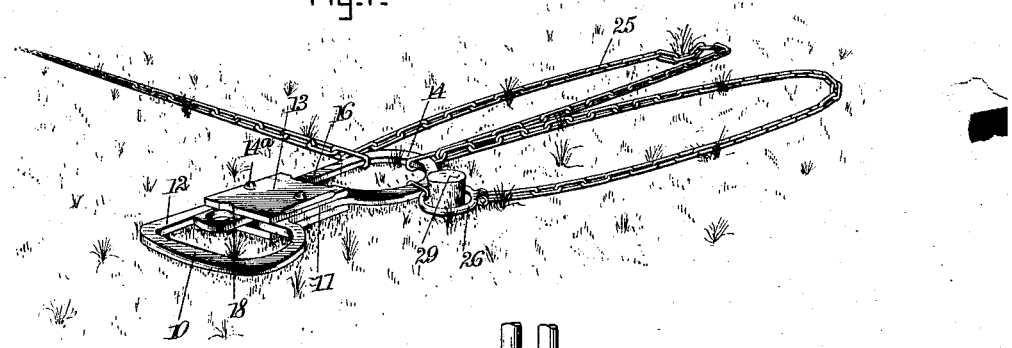
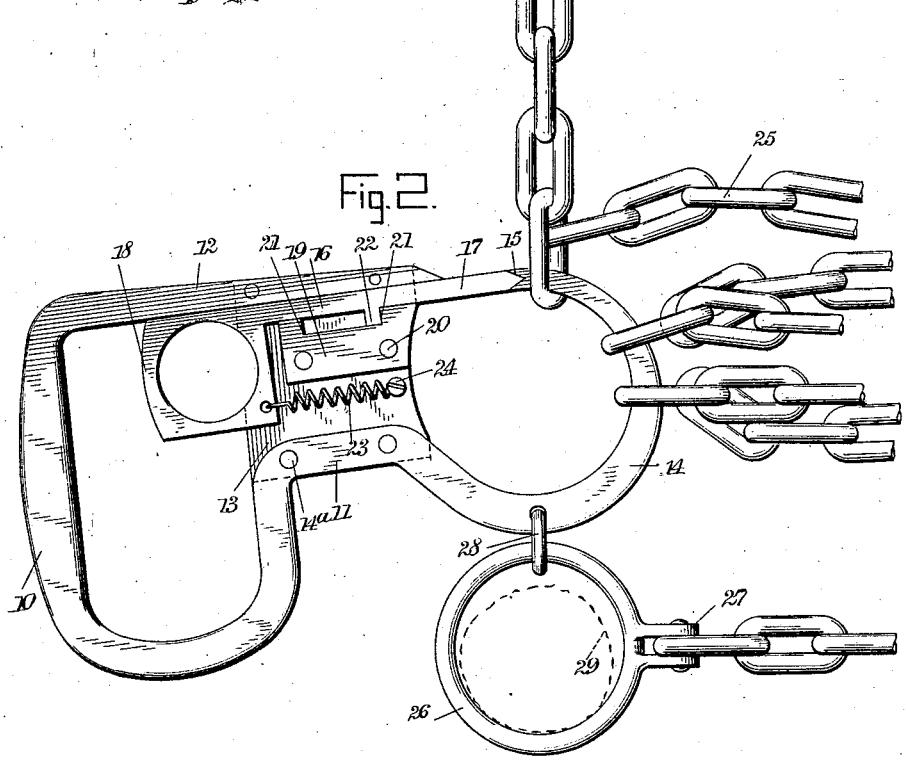
WITNESSES
INVENTOR
Roland L. Lee
BY
ATTORNEYS

UNITED STATES PATENT OFFICE.

ROLAND LINWOOD LEE, OF LANDRUM, SOUTH CAROLINA.

CATTLE-STAKING DEVICE.

1,047,665.  Specification of Letters Patent.  Patented Dec. 17, 1912.

Application filed May 11, 1911. Serial No. 626,602.

*To all whom it may concern:*

Be it known that I, ROLAND L. LEE, a citizen of the United States, and a resident of Landrum, in the county of Spartanburg and State of South Carolina, have invented a new and Improved Cattle-Staking Device, of which the following is a full, clear, and exact description.

This invention relates to devices for staking out animals to permit them to graze, or other like purposes, and has reference more particularly to a device of this class, which comprises a manipulating member, a chain or other flexible element secured at one end to the manipulating member and serving for the fastening or staking out of an animal and means associated with the manipulating member whereby the flexible member can be taken up and shortened as desired.

The object of the invention is to provide a simple, strong, and durable device by means of which cattle or other animals can be staked out to permit them to graze, which can also be used in driving cattle, or in fastening or tying them under different conditions, which affords simple means for carrying the chain or other flexible tying member so that the latter cannot become entangled, or endanger the animal, or the driver, by means of which the flexible member can be lengthened or shortened to any desired degree within the limits of its length, which can be very easily manipulated, which can be inexpensively manufactured, and which is compact in form and light in weight.

The invention consists in the construction and combination of parts to be more fully described hereinafter and particularly set forth in the claims.

Reference is to be had to the accompanying drawing forming a part of this specification, in which like characters of reference indicate corresponding parts in both the views, and in which—

Figure 1 is a perspective view of an embodiment of my invention showing the same in use for staking out an animal; and Fig. 2 is an enlarged plan view of the manipulating member and parts of the flexible member, a portion of the manipulating member being removed.

Before proceeding to a more detailed explanation of my invention, it should be clearly understood that while the device is particularly used for staking out cattle, so that they are afforded limited grazing areas, it can also be advantageously employed in driving cattle, in tying or fastening them, and for other like purposes. Needless to say that if a chain or other flexible tying member of considerable length is employed, it is frequently difficult to carry this member in driving an animal or in staking it out so that the tying member shall not become tangled up and cause possible injury to the animal or driver.

My invention provides means not only for suitably staking out an animal and for carrying the tying member from place to place, but it furthermore affords means for shortening or lengthening the tying member to control the grazing area to be allotted the animal to be staked out.

Referring more particularly to the drawing I provide an operating member fashioned from wrought iron or any other suitable material, and comprising a U-shaped grip or handle 10 by means of which the device can be grasped and manipulated with facility. The ends 11 and 12 of the U-shaped part are laterally disposed and arranged in parallelism, being spaced a suitable distance apart and being connected by two cheeks 13 arranged at opposite sides thereof and secured in place by means of screws or rivets 14ᵃ. The cheeks themselves are spaced apart according to the thickness of the ends 11 and 12. The former extends beyond the cheeks and is curved to form a take-up hook or eye 14 of tapered form, and having the end rearwardly disposed toward the cheeks, and provided with a V-shaped notch 15. A latch 16 is slidably positioned between the cheeks and has a pointed shank 17 adapted to be received in the notch 15. At the other end the latch is extended and formed into a ring or finger grip 18 which projects into the U-shaped handle 10. A stop block 19 is secured between the cheeks by means of screws or rivets 20, and has shoulders 21 between which is movably received a lug 22 of the latch so that the movement of the latch in the direction of its length is limited. The latch is slidably guided between the cheeks and between the end 12 and the block 19. A spring 23 is secured at one end to the handle 10 of the latch, and at the other end by a screw or rivet 24 to one or both cheeks. The spring tends normally to project the latch into a closed position, i. e. into engagement with the end of the hook member 14.

While I have shown herewith a chain 25 associated with the manipulating device as a flexible tying member, it will be understood that any other suitable element adapted for the purpose can be employed. The chain is attached in any convenient manner, preferably by means of a ring 26 having spaced ears between which an end link of the chain is secured. The ring is movably connected by means of an eyelet 28 with the take-up hook 14. If so desired, the chain may be provided with a snap hook or any other suitable device for securing an animal. It will be understood that the chain can be shortened to any desired extent by looping it up upon the take-up hook, the latter being passed through one or more of the intermediate links, as is clearly shown in the drawing.

The ring 26 may be employed for staking out the device, the peg 29 being passed through the ring. To release the chain it is merely necessary to insert a finger through the element 18 and withdraw the latch so that the links can be freed from engagement with the take-up hook.

Having thus described my invention what I claim as new and desire to secure by Letters Patent is:—

1. A device of the class described comprising a manipulating member having a handle and a take-up hook, and adapted to have a chain secured at one end thereto, a latch having a part adapted to close said hook and an extension constituting a finger grip, and a spring normally holding said latch operative to close said hook.

2. A device of the class described comprising a manipulating member having a handle and a take-up hook, spaced cheeks secured to said member, a latch slidably mounted between said cheeks and adapted to close said hook, a spring tending to project said latch into position such that said hook is closed, and means for limiting the movement of said latch, the device being adapted to have a chain secured at one end to said member and adapted to be looped intermediate its ends upon said take-up hook.

3. A device of the class described adapted to have a chain associated therewith and comprising a manipulating member having a U-shaped handle and laterally disposed ends arranged in parallelism, one of said ends being extended and rearwardly disposed to form a take-up hook for the chain, cheeks secured at opposite sides of said laterally disposed ends, a latch member slidably positioned between said cheeks and having an extension constituting a finger grip and projecting into said handle, said latch having a part adapted to engage at the end of said hook to close the same, a stop member secured between said cheeks, said latch having a projection adapted to coöperate with said stop member to limit the movement of said latch, and a spring secured to said latch and to one of said cheeks and normally projecting said latch.

In testimony whereof I have signed my name to this specification in the presence of two subscribing witnesses.

ROLAND LINWOOD LEE.

Witnesses:
ADDIE M. OWENS,
HENRY W. ACKERMAN.

---

Copies of this patent may be obtained for five cents each, by addressing the "Commissioner of Patents, Washington, D. C."